United States Patent [19]

Hoyle

[11] Patent Number: 5,010,873
[45] Date of Patent: Apr. 30, 1991

[54] SOLAR ENERGY INTENSIFIER AND COLLECTOR SYSTEM

[76] Inventor: Jack W. Hoyle, 2609 Taylorsville Rd., Louisville, Ky. 40205

[21] Appl. No.: 574,057
[22] Filed: Aug. 29, 1990
[51] Int. Cl.⁵ ............................................. F24J 2/08
[52] U.S. Cl. .................................. 126/440; 126/439; 126/451
[58] Field of Search ............... 126/440, 438, 439, 424, 126/425, 443, 441, 451, 442, 446, 450; 350/445, 612, 615, 618, 622, 631

[56] References Cited

U.S. PATENT DOCUMENTS

| | | | |
|---|---|---|---|
| 1,683,266 | 4/1928 | Shipman | 126/440 |
| 2,902,028 | 9/1959 | Manly | 126/440 |
| 4,116,223 | 9/1978 | Vasilantone | 126/440 |
| 4,136,674 | 1/1979 | Korr | 126/439 |
| 4,148,300 | 4/1979 | Kaufman, Jr. | 126/440 |
| 4,195,620 | 4/1980 | Rust | 126/439 |
| 4,284,839 | 8/1981 | Johnson | 126/440 |
| 4,347,834 | 9/1982 | York | 126/438 |
| 4,382,434 | 5/1983 | Meckler | 126/440 |
| 4,682,582 | 7/1987 | Zsida | 126/438 |

Primary Examiner—James C. Yeung
Attorney, Agent, or Firm—Maurice L. Miller, Jr.

[57] ABSTRACT

A solar energy intensifier and collector is disclosed which employs a series of radiation intensifying lenses arranged in either a single circle or in two or more concentric circles lying in a single plane, and a like series of reflectors spaced from the plane containing the lenses. Each of the reflectors reflects intensified solar energy from a different one of the lenses onto an energy absorbing target, the target being located at the precise foral distance from each lens as measured along its corresponding energy radiating path which extends from the lens to the corresponding reflector and thence from the reflector to the energy absorbing target. Reflectors for lenses lying in a given diameter concentric circle are spaced the same distance from the lens containing plane but are spaced further from the lens containing plane than are reflectors for lenses lying in lesser diameter concentric circles.

10 Claims, 3 Drawing Sheets

SOLAR ENERGY INTENSIFIER AND COLLECTOR SYSTEM

BACKGROUND OF THE INVENTION

This invention relates generally to solar heating systems and more specifically to solar heating systems which employ a series of radiation intensifying lenses arranged in a single plane in one or more circles having a common center and a like series of adjustable reflectors spaced from the plane of the lenses for reflecting intensified sun rays from the lenses onto a solar energy absorber located along an axis of the circles at the precise focal point distance from each of the lenses.

Generally speaking, numerous solar heating systems have been known and used in the prior art. The construction of such prior art systems vary widely. To be sure, there are such systems which employ a plurality of radiation intensifying lenses. See, for example, Japanese Pat. No. 0092753 issued to A. Tamasaki published June, 1983 entitled Intensifying Collector of Solar Heat which discloses a series of lenses in a hexagonal pattern on the front semi-spherical surface of a transparent spherical body. A curvilinear reflecting plate is located on the back semispherical surface of the body, whereby solar energy is directed to a heat collector located at the center of the spherical body at the focal positions of the various lenses. See also U.S. Pat. No. 1,683,266 issued to L. H. Shipman on Sept. 4, 1928; U.S. Pat. No. 2,902,028 issued to A. H. Manley on Sept. 1, 1959; U.S. Pat. No. 4,284,839 issued to S. A. Johnson on Aug. 18, 1981; and U.S. Pat. No. 4,116,223 issued to M. Vasilantone on Sept. 26, 1978. The Shipman patent discloses a solar heater having a plurality of elongated bar-shaped lenses arranged parallel to one another in a single plane. All of the lenses, except the center lens, direct intensified sun light downwardly into a parabolic shaped trough against individual bar-shaped reflectors which, in turn, reflect the light onto a water pipe surrounded by a glass jacket. Due to the shape of the trough, it is said that the light beams from each lens, other than the center lens, which strike corresponding reflector bars and thereafter impinge on the glass jacketed pipe, travel the same identical distance from each lens to the target. The center bar lens, which is located directly above the glass jacketed pipe target, is focused directly thereon without being reflected. The Manley patent discloses a series of lenses arranged in a rectangular array in a flat plane over an evaporator chamber. The Johnson patent discloses a solar energy apparatus containing two fresnel lenses for directing sun rays on two mirrors which, in turn, reflect the rays upon an energy absorber located at the focus of the lenses as measured along the reflected light path from the lenses to the reflectors and thence to the absorber. The Vasilantone patent discloses a solar heater having a transparent dome containing prism facets on its interior surface which magnify sun light and focus the rays downwardly and inwardly into a heat absorbing liquid. None of these patents involve a series of magnifying lenses arranged in a circular array or in an array of two or more concentric circles lying in a single plane.

Likewise, there are prior art solar energy collecting systems which utilize a plurality of reflectors arranged in various arrays to direct sun light upon an energy absorbing target. See, for example, U.S. Pat. No. 3,924,604 issued to D. E. Anderson on Dec. 9, 1975; U.S. Pat. No. 4,347,834 issued to B. H. York on Sept. 7, 1982 and the previously mentioned Shipman and Johnson patents, the latter two references being the only two in the group which employ a plurality of lenses used in conjunction with a plurality of reflectors. The system of Anderson employs a solar receiver mounted on a column above a series of circumferentially disposed pivotal support pads upon which reflector elements are disposed. The Anderson system, however, does not employ solar radiation intensifying lenses. The York patent discloses a solar reflector consisting of a nested, truncated and inverted trough formed as a reflector array of concentric annular conic frustra.

None of these prior art systems employ a series of lenses arranged in a circle or arranged in two or more concentric circles lying in a single plane and a like series of reflectors spaced from the plane for reflecting intensified radiation from the lenses onto an energy absorbing target located at the precise focal distance from each lens as measured along each reflected light beam path.

By means of my invention, these and other objects not obtained in the prior art are thus achieved.

SUMMARY OF THE INVENTION

It is an object of my invention to provide a novel solar energy intensifier and collector system.

It is a further object of my invention to provide such a system which employs a plurality of radiation intensifying lenses arranged either in a single circle or in two or more concentric circles lying in a single plane and a like plurality of reflectors spaced from the plane for diverting solar energy from each of the lenses onto an energy absorbing target located at the precise focal point distance from each lens as measured along its corresponding energy radiation path.

Briefly, in accordance with my invention, there is provided a solar energy intensifying and collecting system which includes a plurality of solar radiation intensifying lenses disposed in a single plane in at least one circular array, all of the circular arrays having a single common center. A mounting means is also included for supporting the lenses. A plurality of solar radiation reflector assemblies is also included which is equal in number to the plurality of lenses. The reflector assemblies are spaced from the mounting means and each assembly is adapted to reflect solar energy beamed thereon from a different one of the lenses inwardly toward an axis of the circular array. A solar radiation absorbing means is disposed on the axis in a line of sight of each of the reflector assemblies. Each of the reflector assemblies is adapted to reflect solar radiation beamed thereon from its corresponding lens onto the absorbing means at the focal point of the corresponding lens.

These and other objects, features and advantages of my invention will become apparent to those skilled in the art from the following detailed description and attached drawings upon which, by way of example, only a single preferred embodiment of my invention is described and illustrated.

DESCRIPTION OF THE PREFERRED EMBODIMENT

Figure 1:
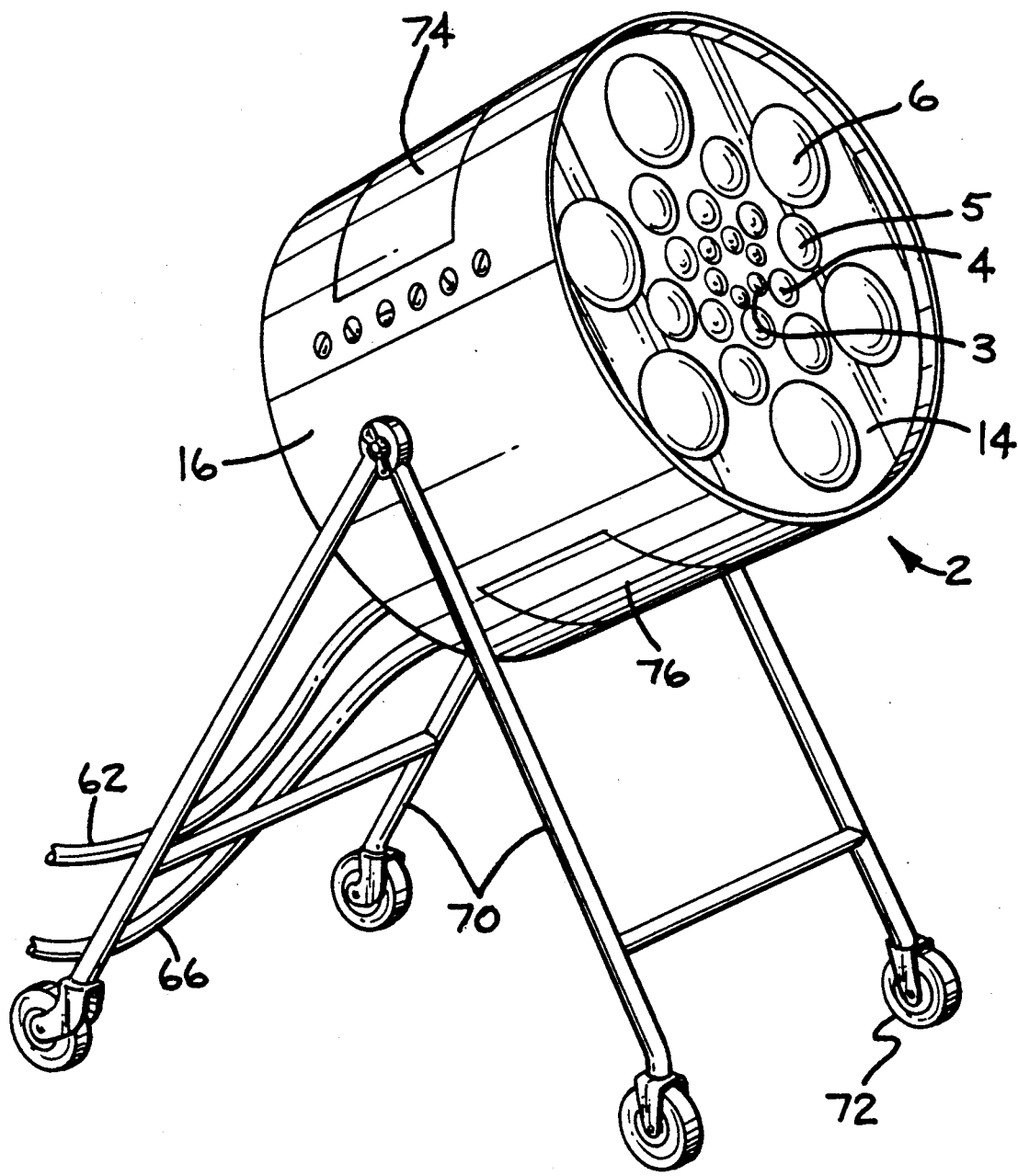
FIG. 1 shows a perspective view of a solar energy intensifier and collector, thus illustrating a preferred embodiment of my invention.

Referring now to the drawing figures, there is shown, in one preferred embodiment of my invention, a solar energy intensifier and collector system 2 including four sets 3, 4, 5 and 6 of radiation intensifying lenses, arranged in and around four different concentric circles 7, 8, 9 and 10, respectively, each of the lenses being mounted in its own close conforming circular opening 12 in a mounting means which, in the present example, is a flat disc-shaped plate 14. The various lenses are secured in the openings 12 by means of suitable fasteners such as L-shaped brackets and machine screws 15 (See FIGS. 2-3 only). The plate 14 is removably mounted in one end portion of a hollow, cylindrically shaped housing 16. The other end portion of the housing 16 contains a flat, disc-shaped cover 18 which is removably disposed therein, the cover 18 containing a circular opening 19 in a central portion thereof for access to the interior of the housing 16.

All of the lenses of any given one of the sets 3, 4, 5 and 6 have identical focal point distances. However, the lenses of the set 3, being located on the innermost concentric circle 7, have a shorter focal point distance than those of the set 4 located on the next larger concentric circle 8, the lenses of the set 4, in turn, have a shorter focal point distance than those of the set 5 on the next larger concentric circle 9, and the lenses of the set 5 have a shorter focal distance than those of the set 6 located on the outermost concentric circle 10.

Figure 2:
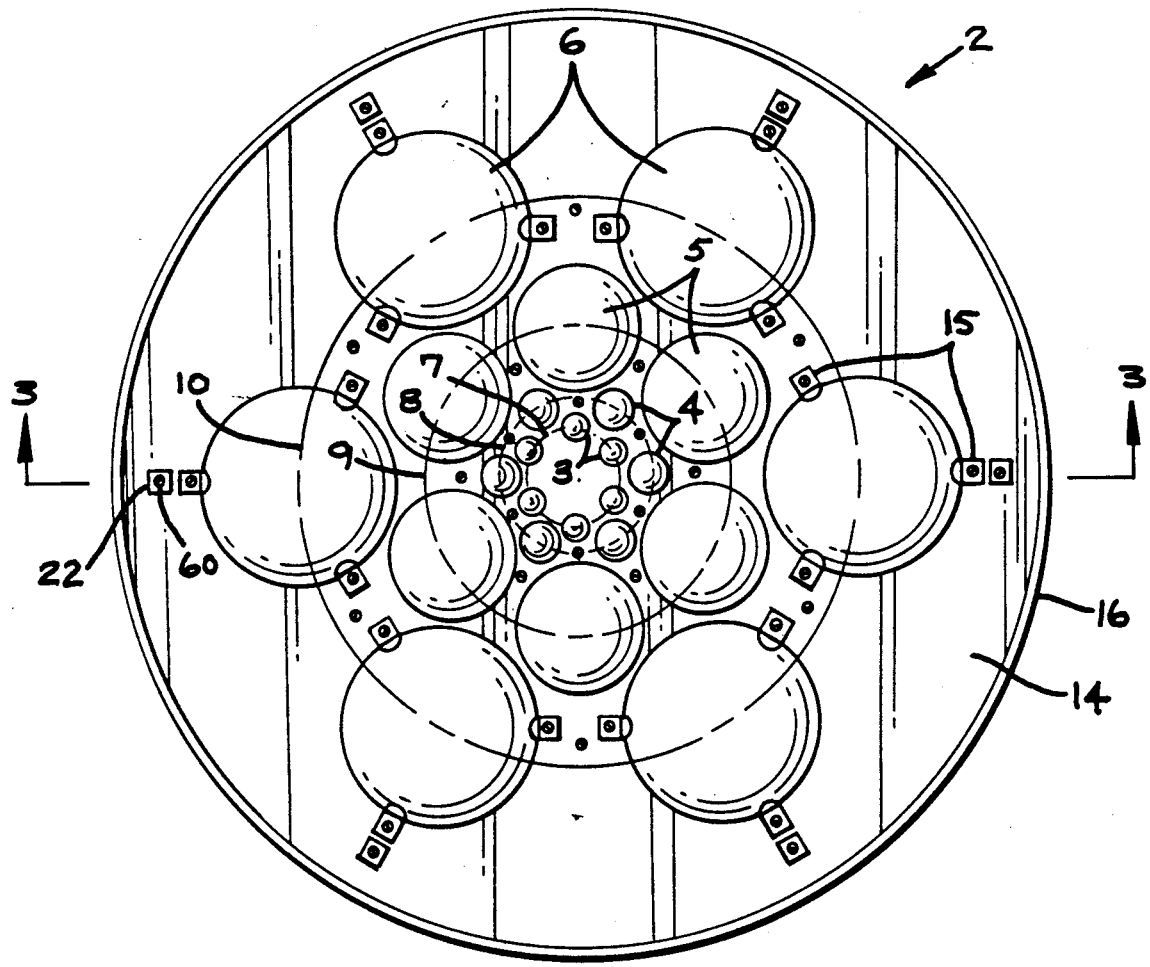
FIG. 2 shows a plan view of a face of the solar energy intensifier and collector of FIG. 1.
Figure 3:
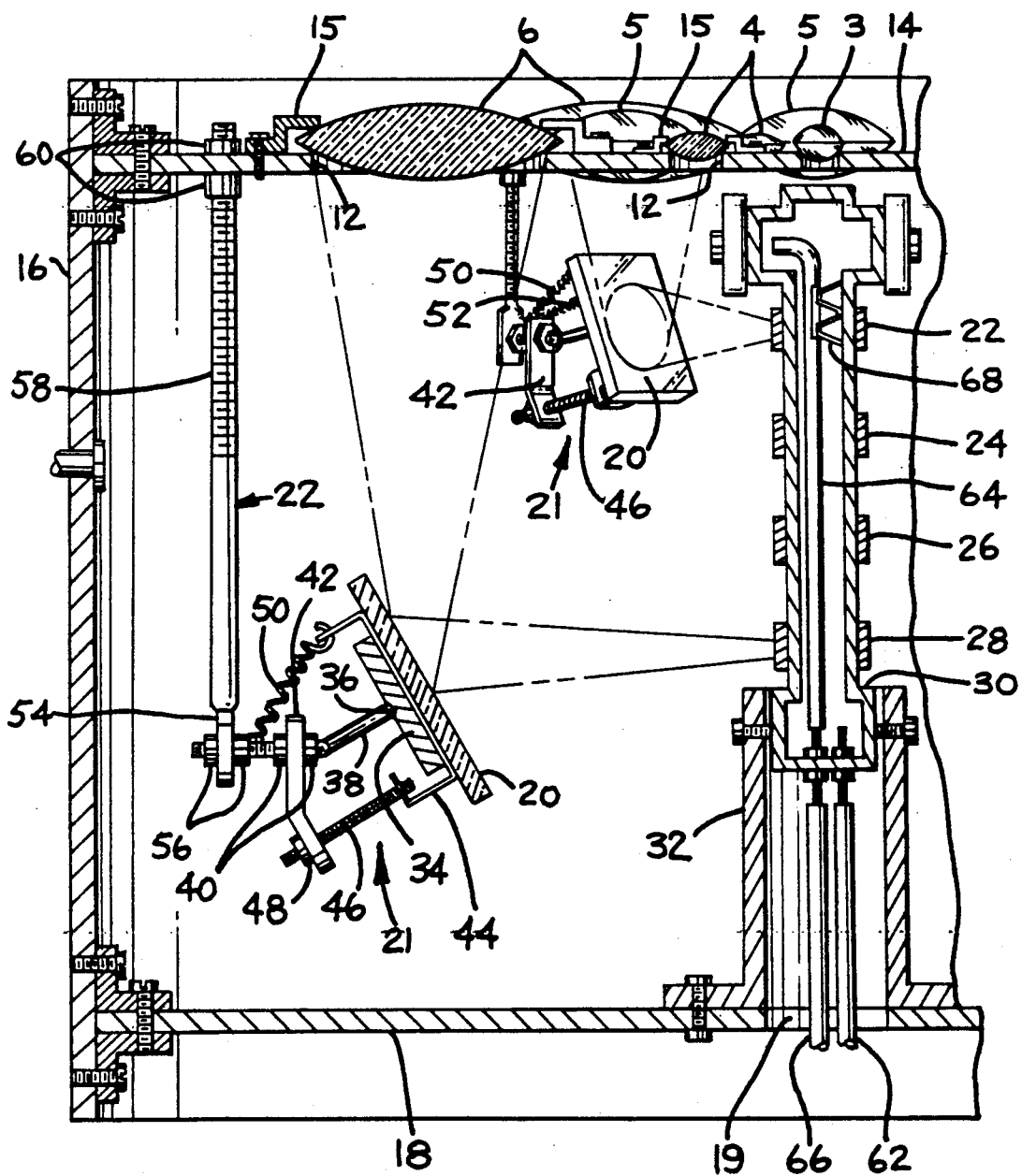
FIG. 3 shows a cross-sectional view of a portion of the solar energy intensifier and collector of FIGS. 1-2 as viewed along cross-section lines 3—3 of FIG. 2, certain reflector parts being broken away for viewing clarity.

As shown in FIG. 2, each of the lenses in each of the sets 3, 4, 5 and 6 is adapted to direct solar energy against the face of a different mirror or reflector 20, each of the reflectors 20 being part of a reflector assembly 21 which is suspended within the housing 16 from an adjustable shaft 22 connected to the plate 14. Each of the reflector assemblies 21 are identical in construction but the reflectors 20 may vary in size from one set of lenses to the next such that no one set of reflectors 20 need be larger than necessary to reflect the energy directed upon it from a given set of lenses. Only two reflectors 20 are shown in the drawing so as to prevent crowding and avoid confusion. The reflectors 20 are manually adjustable in any suitable manner so as to permit solar radiation beamed thereon to be reflected against one of four spaced apart heat absorbent circular bands or collars 22, 24, 26 and 28 formed in tight thermal contact around a heat absorbent, cylindrically shaped standpipe 30. The standpipe 30 extends along the longitudinal axis of the housing 16 toward the center of the plate 14 and is mounted in a hollow collar 32 which is itself affixed to the plate 18 around the central access opening 19. The heat absorbent bands 22, 24, 26 and 28 may be made of metal or metal alloy having good heat conductive quality such as most lead based alloys. The standpipe 30 may be constructed of a suitably durable heat conductive metal alloy such as copper or steel alloy. However, it should not contain lead since the system 2 could conceivably be employed as a heater for hot water, for distillation of sea water to fresh water and the like, which might be used for drinking and cooking purposes, in which event lead contamination must be avoided.

Each of the reflector assemblies 21 contain one of the reflectors 20 mounted against a front surface of a backing plate 34. Each back plate 34 contains a dimple-like recess in the center thereof which opens on its back surface into which a rounded end of a bent, cylindrically shaped rod 38 projects. An end portion of the rod 38 on the other side of the bend from the rounded end 36 is threaded and extends through a pair of conformingly tapped nuts 40 and through a hole in an upper end portion of a bracket 42. A U-shaped bracket 44 extends between the reflector 20 and the backing plate 34 and is adjustably connected on its lower end by means of an elongated screw 46 and nut 48 to a lower end portion of the bracket 42. Opposite sides at an upper end of bracket 44 are connected by means of a pair of coiled springs 50 and 52 (See FIG. 3 for viewing both springs) to the threaded end portion of the bent rod 38, the threaded end of which is inserted through a hole in a flattened lower end 54 of the shaft 22 and confined by means of a pair of nuts 56.

Accordingly, the reflector assembly 21 can be raised or lowered as desired by adjusting a threaded portion 58 of the shaft 22 which extends on an upper end portion thereof through a pair of nuts 60 and a hole in the plate 14 located between the nuts 60. The reflector 21 can be moved radially toward or away from the standpipe 30 by adjustment of the threaded portion of the bent rod 38 by means of the nuts 40. Finally, the angle that the plane of the reflector 20 makes with the longitudinal centerline of the housing 16 and standpipe 30 can be adjusted by using the fingers to adjust the screw 46 and/or the nut 48, wherein the back plate 34 is rotated through an arc on the rounded end of the bent rod 38. In this manner, a beam of solar energy passing through each of the lenses can be reflected upon one of the four collars 22, 24, 26 and 28 and the distance traveled by the beam between a given lens to its corresponding reflector plus the distance from that reflector to one of the energy absorbent collars 22, 24, 26 and 28 upon which the beam is to be directed can be adjusted precisely to be equal to the focal point distance of the corresponding lens for maximum thermal energy transfer from a given lens to its corresponding energy absorbent collar. In the present example of my invention, it will be noted that twenty-four different lenses are employed in four different sizes. Accordingly, twenty-four reflector assemblies 21 are suspended within the housing 16, a different one for use with each different lens. Moreover, there are six lenses in each of the four concentric circles 7, 8, 9 and 10. To avoid having certain ones of the large number of reflector assemblies 21 interfere with the line of sight between certain others of the assemblies 21 and an energy absorbent collar on the standpipe 30, I place the reflector assemblies 21 as viewed in FIG. 2 into four groups located at four different levels and beam the energy reflected by each of these groups onto a different one of the energy absorbent band 22, 24, 26 and 28. Hence, four different energy absorbent bands spaced apart at four different levels on the standpipe 30 are employed in the present example. In the present example, I place the six reflector assemblies 21 used with the lenses 6 in the outermost concentric circle 10 at the lowest level in the housing 16 as viewed in FIG. 2, the six reflector assemblies 21 used with the lenses 5 at the next higher level, the six reflector assemblies 21 used with the lenses 4 at the next higher level and, finally, the six reflector assemblies 21 used with the innermost lenses 3 at the highest level closest to the plate 14. Similarly, I direct the beams from the outermost group of lenses 6 from the corresponding reflectors 20 against the lower collar 28 as viewed in FIG. 2, the beams from the lenses 5 from their corresponding reflectors 20 against the next higher level band 26, the beams from the lenses 4 against the next higher band 24 and, finally, the beams from the innermost lenses 3 against the band 22 near the upper end of the standpipe 30. Also, I prefer to use smaller reflectors 20 with the innermost lenses 3 than those used with the lenses 4, while using smaller reflectors 20 with the lenses 4 than are used with the lenses 5, and smaller reflectors 20 with the lenses 5 than those used with the lenses 6 of the outermost group, all of which helps in eliminating interference by inwardly located reflectors 20 with light beams reflected from outwardly located reflectors.

To utilize the intensified solar energy directed upon the bands 22, 24, 26 and 28 as absorbed by the standpipe 30, I direct cool liquid water from a remote source into a lower end of the standpipe 30 by means of a hose 62. The water thus wells up vertically in the standpipe 30 to the level of the uppermost collar 22. The focal points of the radiation intensified by the lenses 3, 4, 5 and 6 are directed upon the bands 22, 24, 26 and 28 by the various reflectors 20 in the manner as previously explained so that the bands absorb thermal energy and transfer the same to the standpipe 30 to heat and vaporized the water standing therein. The evaporated steam rises to the top of the standpipe 30 and is gathered into the upper open end of an L-shaped metal tube 64 connected on its lower end to a second hose 66 for transfer of steam to a remote appliance such as, for example, a hot water tank or steam turbine. The tube 64 may be stabilized within the standpipe 30 in any suitable manner such as by means of a bracket 68 mounted between an upper end portion of the tube 64 and the adjacent interior wall of the standpipe 30.

To complete the description of the present example of my invention, it will be noted that the housing 16 may be mounted so as to swivel through a wide vertical arc on a suitable support assembly 70. The assembly 70 contains casters 72 for ease of changing the horizontal direction faced by the plate 14. Also, the housing 16 may be mounted in a suitable manner on a suitable automatic solar tracking system if desired. I prefer to provide at least two removable covers 74 and 76 on opposite sides of the housing 16 for ease of access to the interior of the housing 16 to make adjustments in the reflector assemblies 21.

The solar energy intensifier and collector of my invention may utilize any suitable number of lenses disposed equidistantly around any number of rings or circles, from one circle up to as many concentric rings or circles as practical considering the diameter of the outermost ring and the size of the lenses disposed on and around the outermost ring. The use of four concentric rings with six lenses in each ring as shown in the present example is considered exemplary only and may be varied as desired. Also, the number of targets used may likewise be varied so long as a direct line of sight can be maintained between the targets employed and each of the reflectors employed.

Although the present invention has been described with respect to a specific details of a certain preferred embodiment thereof, it is not intended that such details limit the scope and coverage of this patent other than as specifically and positively set forth in the following claims.

I claim:

1. A solar energy intensifier and collector system comprising
   a plurality of solar radiation intensifying lenses disposed in a single plane in at least one circular array, each said circular array having a common center,
   mounting means for supporting said lenses,
   a plurality of solar radiation reflector assemblies equal in number to said plurality of lenses and spaced from said mounting means, each of said assemblies being adapted to reflect solar energy beamed thereon from a different one of said lenses inwardly toward an axis of said circular array, and
   solar radiation absorbing means disposed on said axis in a line of sight of each of said reflector assemblies, each of said assemblies being disposed so as to reflect solar radiation passing through its corresponding lens onto said absorbing means at the focal point of said corresponding lens.

2. The system of claim 1 wherein said plurality of lenses comprises two sets of lenses, each set being disposed on and around a different concentric circle lying in a single plane, each said set containing a series of lenses having identical focal point distances, the focal point distances of each said set being different from that of the other of said set.

3. The system of claim 1 wherein each of said solar radiation reflecting assemblies comprises
   a mirror, and
   means for adjusting said mirror for causing solar energy passing through its corresponding lens to be reflected onto said absorbing means at the effective focal point of said corresponding lens.

4. The system of claim 1 wherein said plurality of lenses is divided into at least two sets, each of said sets being disposed in a different one of said circular arrays, each of said plurality of reflector assemblies being likewise divided into two sets, the reflector assemblies of one set which are associated with the lenses of one set being spaced at a different distance from said mounting means than that of reflector assemblies of the other of said sets of lenses and reflector assemblies.

5. The system of claim 1 wherein said solar radiation absorbing means comprises
   a standpipe,
   at least one radiation absorbing collar formed on said standpipe said collar and standpipe being connected together thermally,
   means for introducing a liquid into a base of said standpipe, and
   means for extracting a vaporized form of said liquid from another end of said standpipe.

6. The system of claim 1 wherein at least one of said reflector assemblies comprises
   a mirror,
   a backing plate containing a dimple-like recess opening onto a rear surface thereof, said mirror being attached to a front surface of said backing plate,
   a threaded shaft adjustably connected on one end thereof to said mounting means and containing a flattened member on the other end thereof,
   a back plate supporting rod containing threading on one end thereof and adjustably inserted through said flattened member and through a pair of threaded fasteners disposed on opposite sides of said flattened member, the other end of said back plate supporting rod being rounded and projecting into said backing plate recess, a first U-shaped bracket extending between said mirror and backing plate, a pair of springs connected between opposite sides of said U-shaped bracket on an upper end portion thereof to a threaded portion of said back plate supporting rod, a second bracket connected to said back plate supporting rod, and an adjustable threaded fastener connected between a lower end of said U-shaped bracket and a lower end portion of said second bracket.

7. The system of claim 1 wherein the plurality of lenses disposed in each of said circular arrays is six, the lenses in each of said arrays being equally spaced around said common center.

8. The system of claim 1 further comprising a housing having at least one open end, said mounting means being disposed in one open end.

9. The system of claim 7 wherein the total number of circular arcs is four.

10. The system of claim 8 further comprising a support assembly attached to said housing, said housing being cylindrically shaped and being adjustable in said assembly through a vertical arc for adjusting said plate perpendicular to the rays of the sun.

* * * * *